United States Patent [19]
Turner

[11] Patent Number: 4,551,833
[45] Date of Patent: Nov. 5, 1985

[54] DISTRIBUTED MONITORING OF PACKET TRANSMISSION DELAY

[75] Inventor: Jonathan S. Turner, Evanston, Ill.

[73] Assignee: AT&T Bell Laboratories, Murray Hill, N.J.

[21] Appl. No.: 521,884

[22] Filed: Aug. 10, 1983

[51] Int. Cl.$^4$ ............... H04Q 11/04; H04Q 11/00
[52] U.S. Cl. ................................. 370/60; 370/54; 370/94
[58] Field of Search ................. 370/60, 94, 54

[56] References Cited

U.S. PATENT DOCUMENTS

| 4,317,195 | 2/1982 | Barberis et al. | 370/60 |
|---|---|---|---|
| 4,320,500 | 3/1982 | Barberis et al. | 370/60 |
| 4,399,531 | 8/1983 | Grande et al. | 370/94 |
| 4,443,875 | 4/1984 | Blausten | 370/60 |
| 4,453,247 | 6/1984 | Suzuki et al. | 370/60 |

OTHER PUBLICATIONS

*Computer Networks*, Chapter 5, Section 5.3.5 Choke Packets, pp. 221-222.
1977 International Conference on Communications, vol. 2, Jun. 12-15, 1977, Chicago, Ill., "Delay and Error Control In a Packet Switched Network", A. G. Fraser, pp. 22.4-121-22.4-123.
IEEE Transactions on Communications, vol. COM-20, No. 3, Jun. 1972, "Performance Measurements on the ARPA Computer Network", Gerald D. Cole, pp. 630-636.

*Primary Examiner*—Douglas W. Olms
*Assistant Examiner*—Curtis Kuntz
*Attorney, Agent, or Firm*—John C Moran

[57] ABSTRACT

A trunk controller and processor arrangement for measuring packet transmission delay from a first trunk controller through a packet switching network to a second trunk controller. Packets comprising logical addresses and voice/data information are received from high-speed trunks and are communicated through the network to destination trunk controllers which are also attached to high-speed trunks. During initial call setup of a particular call, the central processor associated with the network stores the necessary logical to physical address information in the two controllers associated with that call. The associated controllers then perform all logical to physical address translation on subsequent packets of the call. Each trunk controller comprises a delay monitoring circuit which is responsive to a packet received from the attached trunk to assemble a new switch packet consisting of the arrival time, the physical address, and the received packet for transmission through the network to a destination trunk controller. When a switch packet is received from the switching network by a trunk controller, the delay monitoring circuit of that trunk controller calculates the transmission delay time resulting from the transmission of the packet from the sending trunk controller to the destination trunk controller. The delay monitoring circuit then uses this information to calculated a transmission delay sum for a predefined number of packets. After the predetermined number of packets have been received, the monitoring circuit determines whether the transmission delay excursions have increased or decreased in the excess of a multitude of predetermined percentages of transmission delay and notifies the associated processor if such excursions have occurred. At initialization time and as required during system operation, the processor determines the predetermined percentages of transmission delay which are the standards utilized by the trunk controller.

27 Claims, 4 Drawing Figures

DISTRIBUTED MONITORING OF PACKET TRANSMISSION DELAY

CROSS-REFERENCE TO RELATED APPLICATIONS

The following applications were filed on June 25, 1982, and assigned to the same assignee as this application:

J. S. Turner, "Fast Packet Switch", U.S. Pat. No. 4,491,945;

J. S. Turner, "An Interface Facility for a Packet Switching System", U.S. Pat. No. 4,488,289;

J. S. Turner, "End-to-End Information Memory Arrangement in a Line Controller", U.S. Pat. No. 4,488,288;

J. S. Turner, "Packet Switching Loop-Around Network and Facilities Testing", U.S. Pat. No. 4,486,877;

J. S. Turner, "A Fast Packet Switching Network", U.S. Pat. No. 4,494,230; and

W. A. Montgomery, "Time Stamping for a Packet Switching System", Ser. No. 392377.

J. S. Turner, "Duplicated Network Arrays and Control Facilities for Packet Switching", Ser. No. 438572, was filed on Nov. 1, 1982; J. S. Turner, "Packet Load Monitoring by Trunk Controllers", U.S. Pat. No. 4,494,326, was filed on Nov. 4, 1982; J. S. Turner, "Packet Error Rate Measurements By Distributed Measurements", U.S. Pat. No. 4,490,817, was filed on Dec. 13, 1982; and J. S. Turner, "Integrated Self-Checking Packet Switch Node", Ser. No. 495716, was filed on May 18, 1983. All four applications are assigned to the same assignee as this application.

TECHNICAL FIELD

This invention relates to a method and packet switching facilities for monitoring packet transmission delays through a packet switching system. In particular, the method and facilities specifically provide for the monitoring of delay variations from predefined standards on a distributed basis in equipment interfacing transmission links to a packet switching network.

BACKGROUND OF THE INVENTION

In a packet switching system comprising a large number of switching networks, it is desirable to monitor the delay introduced during the transmission of packets through each switching network. The delay monitoring allows system administration to identify routes which are experiencing long delays and to use alternate routes for new packet calls being set up within the packet system. In prior art systems which utilized a general purpose computer as the centralized, or main switching, element, the same computer could also have performed the delay calculations. However, in a packet switching system as disclosed in the above-identified applications, the switching of packets within each switching network is performed by distributed hardware. For example, the J. S. Turner, U.S. Pat. No. 4,494,230, "A Fast Packet Switching Network", describes a system comprising fast packet switching nodes interconnected by high-speed digital transmission links with each link being terminated on both ends by interface facilities.

A communication path is set up through the fast packet switching system by initially routing a call setup packet from an originating terminal to each central processor controlling a switching node in the route to the destination terminal. That packet precedes all other packets of the packet call. Each central processor is responsive to a receipt of the setup packet to store logical to physical address translation information in memories of its associated interface facilities, or trunk controllers. Thereafter, the central processor involvement in the communication of all subsequent packets for the message of that call is virtually eliminated. The physical address defines a path through the switching network of the switching node to an output trunk controller in the communication path to the destination terminal.

Upon receipt of a message packet from a link, a trunk controller utilizes its memory information for the assemblage of a new packet containing the physical address plus the originally received message packet. The trunk controller then sends the new packet to the switching network which in turn routes the new packet to the output trunk controller.

Since the central, or main, processor does not handle each individual packet in the Turner fast packet switching system, there exists a need for techniques which can accurately perform the delay monitoring functions. The monitoring should desirably introduce minimal delay into the switching of packets.

One of the aforementioned cases dealing with the Turner switching system, W. A. Montgomery, Ser. No. 392,377, relates to a time stamping arrangement in a trunk controller for accumulating the time taken by an individual packet to transverse a total packet switching system. No structure is disclosed in that case for providing the delay monitoring function in accordance with the subject matter of this case.

SUMMARY OF THE INVENTION

In an illustrative method and structural embodiment, a departure in the art is achieved by autonomously and accurately detecting transmission delay excursions beyond predetermined standards on or for packets during their routing between transmission links by a plurality of interface facilities and a packet switching network. Interface facilities are initiated by a central processor at system start-up time by storing indices defining delay standards, and thereafter, the interface facilities, or trunk controllers, with the aid of arrival time information and internal arithmetic, masking and storage circuits, ascertain delay excursions for groups of packets from the standards set by the processor.

The accuracy is achieved because the trunk controllers repetitively measure the actual transmission delay resulting from the communication of a predefined number of packets and perform a statistical smoothing function with respect to these measurements. The transmission delay measured is the time required for a packet to be communicated from one transmission link to another transmission link through two trunk controllers, each attached to one of the transmission links, and the packet switching network. The statistical smoothing minimizes the effect of short periods of rapid transmission delay variations by utilizing data from a previous group of packets as a starting point for the current measurement. An important attribute is that the measurements include the actual time required to communicate each individual packet of the predefined group from the receiving trunk controller to the transmitting trunk controller which gives an accurate evaluation of the total transmission path through both the trunk controllers and the packet switching network. The measuring is done essentially by the trunk controllers with the exception that processor time is required to handle delay excursions from the processor-set standards, and to initialize the measurement functions.

Advantageously, each trunk controller notifies a processor when transmission delay excursions result in increases or decreases of transmission delay in excess of a multitude of predetermined percentages of delay. This capability assures that the processor is automatically notified of significant increases and decreases in the transmission delay of packets through the system. At initialization time and as required during system operation, the processor defines standards which are the predetermined percentages of delays utilized by the trunk controllers. Hence, the processor has the capability to monitor the transmission delays within the system as closely as is necessary for desired system operation. The transmission links are illustratively high-speed digital trunks.

Each trunk controller, upon receipt of a packet from the attached trunk, assembles the received packet into a switch packet for transmission through the packet switching network to the destination trunk. An arrival time circuit in the receiving trunk controller is responsive to the formation of the switch packet for inserting into the switch packet signals representing the time at which the packet arrived from the attached trunk. When a destination trunk controller receives the switch packet from the packet switching network, it utilizes the arrival time information to perform the transmission delay measurements.

In order to facilitate the transmission delay measurements, each trunk controller comprises an arithmetic unit for calculating the transmission delay on the basis of the arrival time information and the present time and for calculating a sum of the transmission delays for all of the predefined number of packets. Each trunk controller has a counter circuit for determining when the predefined number of packets has been received and further comprises an error circuit responsive to the transmission delay sum for determining whether there has been an increase or decrease of transmission delay in excess of the multitude of predetermined percentages of delay.

The error detection circuit comprises a present delay sum register and a previous delay sum register for storing the calculated delay sums for the present predefined group of packets and the previous predetermined group of packets, respectively. After a predetermined number of packets have been received, bit signals representing the present delay sum are transferred from the arithmetic unit to the present delay sum register. Subsets of the bit signals stored in the present delay sum register and previous delay sum register are then compared by a comparator within the error detection circuit. If the two subsets of bit signals are not equal, a report is generated and transmitted illustratively to the central processor. After the comparison, the bit signals stored in the present delay sum register are also stored in the previous delay sum register so that the latter is updated for the next comparison. The subsets are selected from the contents of the two registers by utilizing two mask circuits that are controlled by bit mask signals stored in a mask register. The contents of the mask register are loaded at initialization time by the central processor. Also, at initialization time, the central processor supplies the bit signals defining the predetermined number of packets to be received.

The arithmetic unit comprises a subtractor circuit for subtracting the arrival time from the present time and an accumulator for calculating the sum of the transmission delays. In addition, the accumulator is responsive to the predefined number of packets being received for transmitting the delay sum to the present delay sum register and for dividing the delay sum by a predefined number of initialize its contents for the next predefined number of packets. The subtractor circuit comprises a counter for maintaining the present time information and a serial adder responsive to the two's complement of the arrival time signals for performing an effective subtraction of the arrival time from the present time. Advantageously, the addition is performed bit serially.

The method performs transmission delay measurements on a predefined number of packets during their routing between transmission links by a plurality of interface facilities and a packet switching network by repetitively calculating the individual delay of each packet and by calculating the sum of delays for all of the predefined number of packets. The present delay sum is selectively compared with a previous delay sum. The selective comparison is performed by using central processor determined mask bit signals to logically select subsets of bits from the present and previous delay sums and to compare these subsets. If the subsets are not equal, then a report is transmitted illustratively to the central processor. The logical selection of subsets for comparison allows a multitude of delay excursions to be checked rather than a single excursion.

BRIEF DESCRIPTION OF THE DRAWING

In general, system elements, when first introduced on a figure, are each designated with a number that uses the figure number as the most significant digits of the element number.

The principles of this invention are disclosed as incorporated, by way of example, in a packet switching system of the type disclosed in J. S. Turner, U.S. Pat. No. 4,494,230, "A Fast Packet Switching Network". The latter disclosure may be consulted for an understanding of the construction and operation of the elements illustrated in FIG. 1 and the manner in which the packet switching network shown in FIG. 1 would be utilized in a packet switching system.

DETAILED DESCRIPTION

Figure 1:
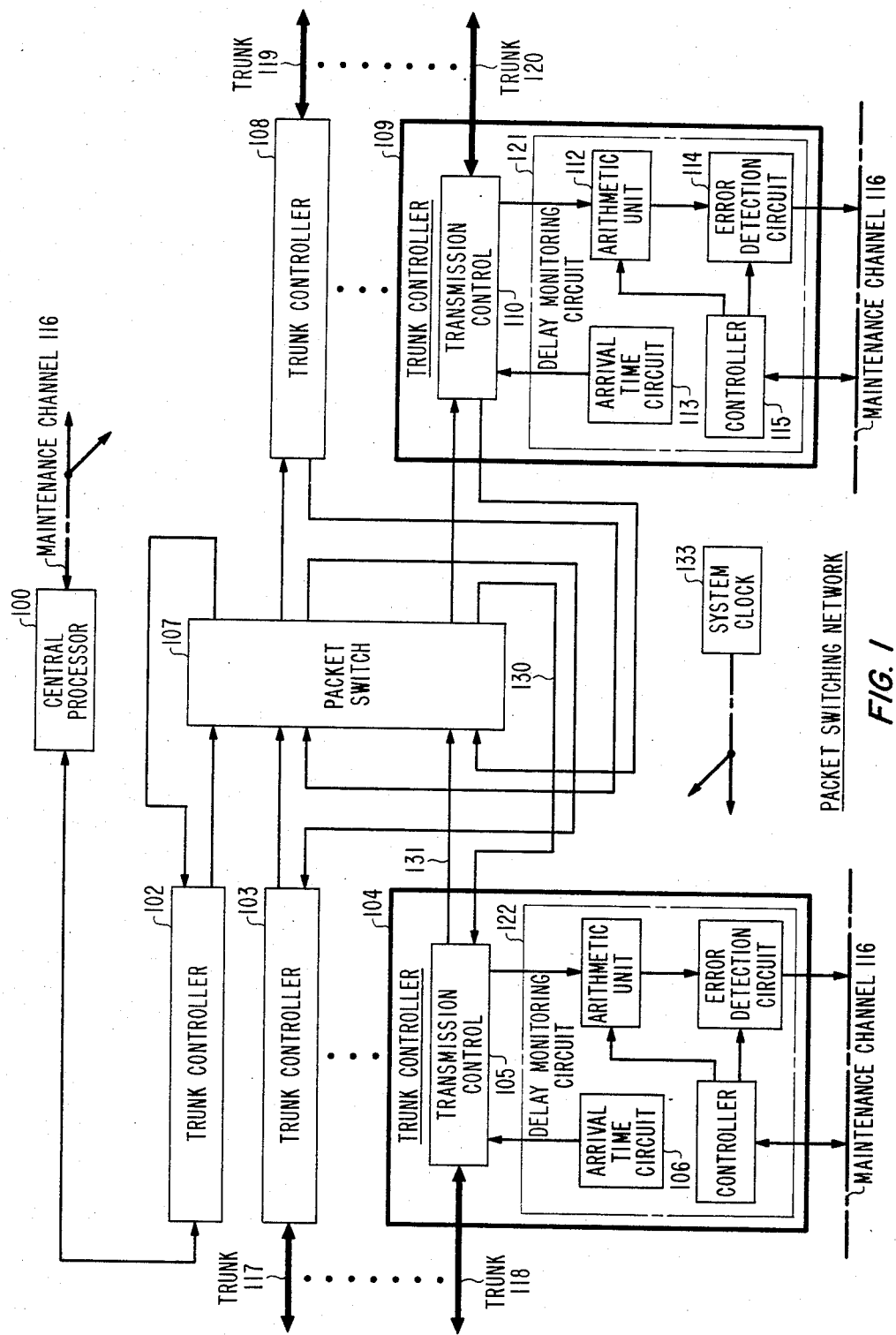
FIG. 1 illustrates, in block diagram form, a packet switching network utilizing the present invention.

FIG. 1 shows an illustrative packet switching network serving a plurality of high-speed trunks such as trunk 117 and 119. First, a general description of the subsystems constituting the packet switching network of FIG. 1 is given, and then, a description is given of the delay monitoring circuit used in each trunk controller which is the focus of this invention. As shown in FIG. 1, packet switch 107 terminates a plurality of trunk controllers and cooperates with central processor 100 via central processor trunk controller 102. Each trunk packet transmitted on a trunk contains a logical address which specifies the route that the trunk packet is to take through the packet switching network. Each trunk controller comprises a memory containing a translation table for converting the logical addresses into switch addresses which are used by switch 107 to route the packets to a destination trunk controller. The translation information is stored in the memory of each trunk controller by central processor 100 via trunk controller 102 and switch 107 in response to call setup and call reply packets. A more complete description of the utilization of call setup and call reply packet is given in the previously mentioned J. S. Turner, U.S. Pat. No. 4,494,230, "A Fast Packet Switching Network", and is not repeated in this description.

Figure 2:
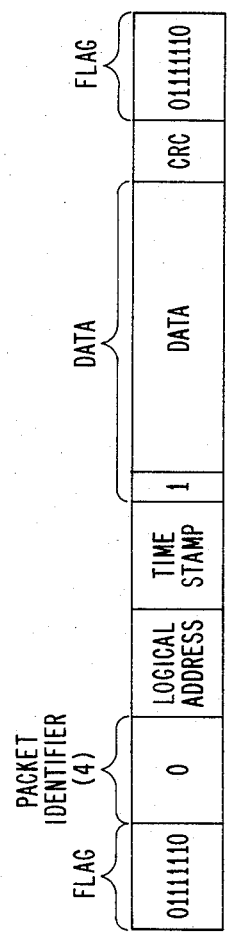
FIG. 2 illustrates the contents of a trunk packet received from a high-speed trunk by a trunk controller.
Figure 3:
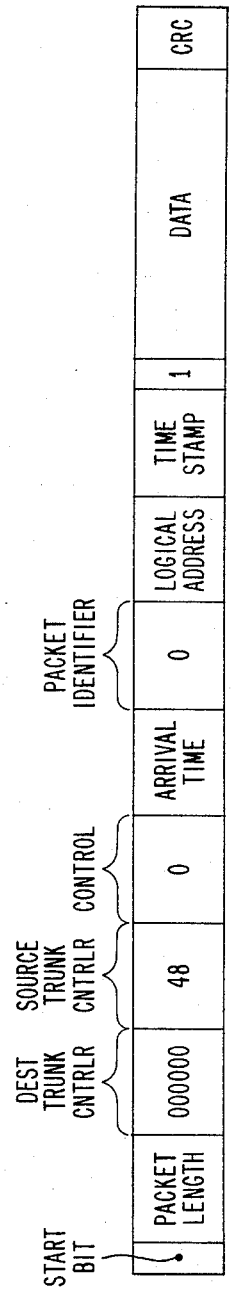
FIG. 3 illustrates the contents of a switch packet which is used to route the trunk packet and the arrival time information to a destination trunk controller through the packet switch.

To illustrate the operation of switch 107, consider the routing of the packet illustrated in FIG. 2 from trunk 118 to trunk 120 via trunk controllers 104 and 109 and switch 107. Upon receipt of the packet illustrated in FIG. 2, trunk controllers 104 assembles the trunk packet into a switch packet as illustrated in FIG. 3. The switch packet comprises all the information of the trunk packet of FIG. 2 with the exception of the flag fields and the information necessary to route the packet through switch 107 to trunk controller 109. In addition, arrival time circuit 106 inserts the time of arrival of the trunk packet at trunk controller 104 into the arrival time field of the switch packet. As described in greater detail in J. S. Turner, U.S. Pat. No. 4,494,230, switch 107 is responsive to the destination trunk controller field to route the switch packet to trunk controller 109. In response to the receipt of the switch packet from switch 107, trunk controller 109 removes the information which originally constituted the trunk packet received by trunk controller 104, adds the necessary flag fields, and transmits the resulting trunk packet on trunk 120.

Turning now to the manner in which the delay monitoring circuit 121 functions in response to receipt of the switch packet at trunk controller 109. All trunk controllers contain a delay monitoring circuit similar in design to delay monitoring circuits 121 and 122. The delay monitoring circuit statistically measures the sum of delays experienced by a predefined number of packets during transmission through switch 107. The number of packets, over which the measurements are performed, is determined by central processor 100 at initialization time. A statistical smoothing function is implemented by dividing the measurement of the sum delay for a previous group of packets by two and using it as an initial value for the next group of packets. If the delay measurements for two successive groups of packets indicate that the sum delay rate has increased or decreased more than any one of a multitude of percentages of delay, a report signal is transmitted by error detection circuit 114 to processor 100 via maintenance channel 116. This determination is performed by mask-comparing numbers representing sum delays for two successive groups of packets.

At initialization time, processor 100 initially loads the predefined number of packets in a group into controller 115 and a bit mask used to control the mask-comparing into the error detection circuit 114. Upon receipt of a packet by transmission control 110, arithmetic unit 112 calculates the delay time based on the present time and the contents of the arrival time field of the switch packet. After calculating the delay time, arithmetic unit 112 then adds this time into an internally stored sum of delay times for that particular group of packets. When controller 115 determines that a complete group of packets has been received, it transfers the sum of the delay times from arithmetic unit 112 to error detection circuit 114 and actuates arithmetic unit 112. The latter divides the sum by two and stores it internally in preparation for the next group of packets. In response to receipt of the sum, error detection circuit 114 compares this delay sum against a previous delay sum stored internally. This comparison is done by masking out specified bits under control of the internally stored mask bits in circuit 114. If the two mask-compared delay sums are not equal, then a report signal is transmitted to central processor 100 via maintenance channel 116. After performing the comparison, error detection circuit 114 stores the sum delay received from arithmetic unit 112 as the previous sum delay in preparation for the next group of packets.

Figure 4:
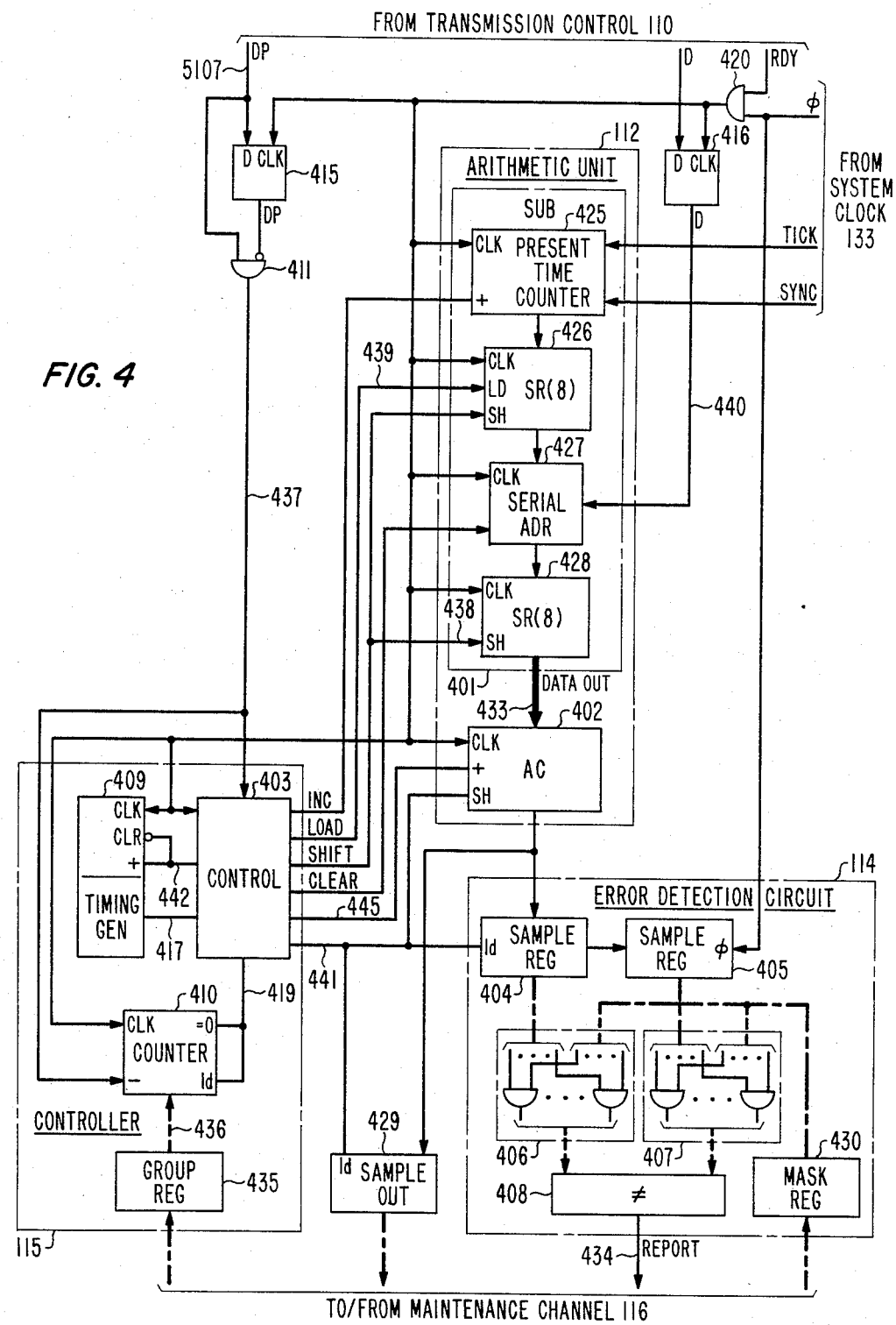
FIG. 4 is a detailed block diagram of the delay monitoring circuit of trunk controller 109.

With the exception of arrival time circuit 113, the delay monitor circuit is shown in greater detail in FIG. 4. A complete description of the arrival time circuit 113 is given in J. S. Turner, U.S. Pat. No. 4,494,230 and is not repeated here. Arithmetic unit 112 consists of two basic units: subtractor 401 and accumulator 402. Subtractor 401 subtracts the arrival time contained in a received switch packet from the present time for calculating the delay of the packet during transmission. Subtractor 401 performs this operation by serially adding the contents of the present time counter 425 via shift register 426 to the contents of the arrival time field of the received packet and placing the result serially into shift register 428. The contents of arrival time field are a 2's complement representation of the arrival time of the trunk packet at trunk controller 104. The contents of shift register 428 represent the delay time which is appropriately transmitted to accumulator 402 via bus 433. Accumulator 402 adds the delay time received via bus 433 to an internally stored delay sum which is the present delay sum and, upon receipt of appropriate signals from control 403, transfers this delay sum to sample register 404 of error detection circuit 114, and performs the necessary shifting operations to properly initiate the internally stored delay sum for the next group of packets.

Error detection circuit 114 stores the present delay sum in sample register 404 and the previous delay sum in sample register 405. The mask bits received from processor 100 via maintenance channel 116 are stored in mask register 430 with the actual mask operations being performed by elements 406 and 407. The latter comprise a plurality of logical AND gates. Comparator 408 compares the resulting masked delay sums and generates the report signal on conductor 434 which is transmitted to central processor 100 via maintenance channel 116 if the compared mask delay sums are not equal.

In response to a receipt of a signal on conductor 437 indicating the start of a packet, controller 115 conditions timing generator 409 to time for when the first bit of the arrival time field is being transmitted via conductor 440. Controller 115 conditions timing generator 409 by transmitting a signal via conductor 442, and timing generator 409 indicates the start of the arrival field by transmission of signal via conductor 417. Counter 410 is used to determine when a group of packets has been received. The number of packets within a group is determined by the contents of group register 435 which is loaded at initialization time by processor 100 via maintenance channel 116.

Consider the following illustrative example of how controller 115, arithmetic unit 112 and error detection circuit 114 perform the necessary packet delay measurements. The start of a packet is detected by gate 411 which detects the occurrence of a "0" on the output of flip-flop 415 and a "1" on the conductor 5107 indicating the start of a packet. In response to the output of gate 411 being a "1", counter 410 decrements by one. Note, that when counter 410 decrements to zero the predetermined number of packets have been received. Control 403 is also responsive to a "1" on the output of gate 411 to initialize timing generator 409 by transmitting a signal via conductor 442. Timing generator 409 upon being initialized counts the arrivals of bits of the packet until the arrival field is present on the output of flip-flop 416. The arrival of a bit is indicated by gate 420 transmitting a "1" via conductor 421 since the presence of both the theta and the rdy signal define the availability of a data bit.

When the start of the arrival time field is present on the output of flip-flop 416, timing generator 409 signals control 403 via conductor 417. In response to the signal on conductor 417, control 403 signals subtractor 401 to shift the arrival time field appearing on the output of flip-flop 416 into subtractor 401 and transfer the present time maintained in counter 425 to shift register 426. Subtractor 401 then serially subtracts the contents of the arrival time field from the present time in shift register 426. The arrival time field represents the arrival time as a 2's complement binary number so that by adding this 2's complement binary number to the present time in shift register 426 a subtraction is accomplished. This addition is done by serial adder 427, and the results are serially stored in shift register 428.

Upon receipt of the signal on conductor 417 indicating the start of the arrival time field, control 403 executes the following operations. Control 403 transmits a load signal via conductor 439 to shift register 426 resulting in shift register 426 storing the contents of counter 425 which represents the present time. Control 403 then transmits a shift signal via conductor 438 to shift registers 426 and 428. Shift register 426 is responsive to the shift signal to transmit each of the stored bits serially to serial adder 427. Serial adder 427 is responsive to the bits from shift register 426 and the arrival time data currently being transmitted on conductor 440 to add the two bit streams together and transfer the result to shift register 428 which stores the resulting sum bit by bit in response to the shift signal transmitted via 438. The results of this subtraction then are transmitted on cable 414 to accumulator 402.

After the entire time arrival field has been received, control 403 causes the contents of shift register 428 to be added to the contents of accumulator 402 by transmitting a signal on conductor 445. The contents of accumulator 402 represent the statistical time delay sum of the packets thus far received of the present group. After the addition has been performed, and if counter 410 is indicating that all the packets for the present group have been received by transmission of a signal on conductor 419, control 403 transmits a signal via conductor 441 which causes the contents of accumulator 402 to be first loaded into sample register 404 and sample out register 429. Also, in response to the signal transmitted via conductor 441, accumulator 402 performs a shift in preparation for the next group of packets.

After the contents of accumulator 402 has been stored in sample register 404, the contents of sample registers 404 and 405 are selectively compared by the contents of mask register 430 controlling elements 406 and 407 which in turn control the transmission of the contents of sample registers 404 and 405 to comparator 408. If the outputs of elements 406 and 407 are not equal, a report is transmitted to the processor 100 which initiates the necessary maintenance procedure to correct the transmission delay conditions.

It is to be understood that the above-described embodiment is merely illustrative of the principles of this invention; other arrangements may be devised by those skilled in the art without departing from the spirit and scope of the invention.

What is claimed is:

1. A transmission delay monitoring arrangement for measuring transmission delay of a predetermined number of packets during communication of the latter from a first circuit interfacing a communication channel with a packet switching network through said network to a second circuit interfacing another communication channel to said network, the invention comprising:

said first circuit comprises means for ascertaining arrival times of each of said predetermined number of packets; and means for inserting the individual ascertained arrival times into each of said predetermined number of packets;

said second circuit comprises means responsive to a receipt of each of said predetermined number of packets and to said ascertained arrival times and the present time for calculating present sum delay signals representing an amount of time consumed in communicating said predetermined number of packets;

means for defining transmission delay thresholds; and means responsive to said transmission delay thresholds from said defining means, said present sum delay signals from said calculating means, and a receipt of reference sum signals for indicating transmission delay excursions beyond said thresholds by said present sum delay signals from said reference sum delay signals.

2. The monitoring arrangement of claim 1 wherein said calculating means comprises subtractor means responsive to arrival time signals representing said ascertained arrival times for each of said predetermined number of packets for generating delay signals representing the difference between said arrival time signals and signals representing said present time;

accumulator means responsive to said delay signals for adding said delay signals to said present sum delay signals; and means for operating said calculating means upon receipt of all of said predetermined number of packets for effecting a predetermined division of said sum signals.

3. The monitoring arrangement in accordance with claim 1 wherein said defining means comprises:

mask register means for storing a plurality of mask signals;

mask circuit means responsive to said present sum delay signals, said reference sum delay signals and the stored mask signals for logically generating a first and second sets of mask output signals; and said indicating means comprising a means for comparing said sets of mask output signals to indicate said transmission delay excursions upon said sets of mask output signals not being equal.

4. A delay monitoring arrangement for measuring delay in the transmission of a predetermined number of packets through a packet switching network, the invention wherein said arrangement comprises:

means for ascertaining arrival times of each of said predetermined number of packets at said network;

routing means for transmitting arrival time signals representing said ascertained arrival times and each of said predetermined number of packets through said network;

means for generating a control signal upon transmission of all of said predetermined number of packets through said network;

means responsive to said arrival time signals for determining signals representing the transmission delay of each of said predetermined number of packets within said network;

means responsive to said control signal and said delay signals for calculating a first set of signals representing a present transmission delay sum for all of said predetermined number of packets;

means for storing a second set of signals representing a reference transmission delay sum; and means responsive to subsets of signals of said first and second sets of signals for generating a report signal indicating excursions of said present transmission delay sum from said reference transmission delay sum.

5. The monitoring arrangement in accordance with claim 4 wherein means responsive to a receipt of said arrival time signals comprises means for determining signals representing departure time of each of said predetermined number of packets from said network;

means responsive to said arrival time signals and said departure time signals for determining said delay signals; and said calculating means comprises means for storing sum signals and accumulator means responsive to said delay signals for adding the latter to said sum signals.

6. The monitoring arrangement in accordance with claim 5 wherein said calculating means further comprises a present delay register responsive to said control signal for storing most significant signals of said sum signals as said first set of signals.

7. The monitoring arrangement in accordance with claim 5 wherein said accumulator means is further responsive to said control signal for effecting a predetermined division of the contents of said accumulator means in preparation for receipt of another packet of the next sequential predetermined number of packets.

8. The monitoring arrangement in accordance with claim 5 wherein said arrival time signals represent said arrival time in complemented representation;

said means for determining said delay signals comprises means for serially adding said arrival time signals and said departure time signals; and means responsive to said serial addition for storing the results to generate said delay signals.

9. The monitoring arrangement in accordance with claim 4 wherein said arrangement further comprises means for generating a packet present signal upon receipt of each of said predetermined number of packets from said network;

said generating means comprising a counter circuit decremented in response to said packet present signal for counting said predetermined number of packets;

means responsive to said counter circuit decrementing to a predefined value for generating said control signal indicating the receipt of said predetermined number of packets;

constant register means for storing signals representing said predetermined number of packets; and means responsive to said control signal for transferring the contents of said constant register means to said counter circuit to initialize said counter circuit for counting of said predetermined number of packets.

10. The monitoring arrangement in accordance with claim 4 wherein said means for generating said report signal comprises:

mask register means for storing a plurality of mask signals;

mask circuit means responsive to said first and second sets of signals and said mask signals for logically generating a first and a second set of mask output signals; and means for comparing said sets of mask output signals for generating said report signal indicating excursions of said present transmission delay sum from said reference transmission delay sum upon said sets of mask output signals not being equal.

11. A delay monitoring arrangement for measuring delay in the transmission of a predetermined number of packets each comprising arrival time signals through a packet switching network, said arrangement comprises:

means for generating a control signal upon transmission of all of said predetermined number of packets through said network;

means responsive to said arrival time signals for determining signals representing the transmission delay of each of said predetermined number of packets within said network;

means responsive to said control signal and said delay signals for calculating a first set of signals representing a present transmission delay sum for all of said predetermined number of packets;

means for storing a second set of signals representing a reference transmission delay sum; and means responsive to subsets of signals of said first and second sets of signals for generating a report signal indicating excursions of said present transmission delay sum from said reference transmission delay sum.

12. The monitoring arrangement in accordance with claim 11 wherein said means for generating said control signal comprises means for generating a packet present signal upon receipt of each of said predetermined number of packets from said network;

a counter circuit decremented in response to said packet present signal for counting said predetermined number of packets;

means responsive to said counter circuit decrementing to a predefined value for generating said control signal indicating the receipt of said predetermined number of packets;

constant register means for storing signals representing said predetermined number of packets; and means responsive to said control signal for transferring the contents of said constant register means to said counter circuit to initialize said counter circuit for counting of said predetermined number of packets.

13. The monitoring arrangement in accordance with claim 11 wherein said determining means comprises means for calculating the departure time of each of said predetermined number of packets from said network;

means responsive to said arrival time signals and said departure time signals for determining said delay signals.

14. The monitoring arrangement in accordance with claim 13 wherein said calculating means comprises means for storing sum signals; and
accumulator means responsive to said delay signals for adding the latter to said sum signals.

15. The monitoring arrangement in accordance with claim 14 wherein said calculating means further comprises a present delay register responsive to said control signal for storing most significant signals of said sum signals as said first set of signals.

16. The monitoring arrangement in accordance with claim 15 wherein said accumulator means is further responsive to said control signal for effecting a predetermined division of the contents of said accumulator means in preparation for receipt of another packet of the next sequential predetermined number of packets.

17. The monitoring arrangement in accordance with claim 16 wherein said arrival time signals represents said arrival time in complemented representation;
said means for determining said delay signals comprises means for serially adding said arrival time signals and said departure time signals; and
means responsive to said serial addition for storing the results to generate said delay signals.

18. A transmission delay monitoring arrangement for measuring transmission delay of a predetermined number of packets during communication of the latter through a packet switching system and each of said packets comprising arrival time signals, said arrangement comprises:
means responsive to a receipt of said arrival time signals of each of said predetermined number of packets and the present time for calculating present sum delay signals representing an amount of time consumed in communicating said predetermined number of packets;
means for defining transmission delay thresholds; and
means responsive to said transmission delay thresholds from said defining means, said present sum delay signals from said calculating means, and reference sum signals for indicating transmission delay excursions beyond said thresholds by said present sum delay signals from said reference sum delay signals.

19. The monitoring arrangement of claim 18 wherein said calculating means comprises subtractor means responsive to said arrival time signals of each of said predetermined number of packets for generating delay signals representing the difference between said arrival time signals and signals representing said present time;
accumulator means responsive to said delay signals for adding said delay signals to said present sum delay signals; and
means for operating said calculating means upon receipt of all of said predetermined number of packets for effecting a predetermined division of said sum signals.

20. The monitoring arrangement in accordance with claim 18 wherein said defining means comprises:
mask register means for storing a plurality of mask signals;
mask circuit means responsive to said present sum delay signals, said reference sum delay signals, and the stored mask signals for logically generating a first and second sets of mask output signals; and
said indicating means comprising a means for comparing said sets of mask output signals to indicate said transmission delay excursions upon said sets of mask output signals not being equal.

21. The monitoring arrangement in accordance with claim 20 further comprising processor means for loading said mask signals into said mask register means during the initialization of the packet switching system; and
said processor means responsive to the indications of said transmission delay excursions for executing maintenance operations.

22. A method of measuring delay in the transmission of a predetermined number of packets through a packet switching system comprising a packet switching network, a plurality of transmission means, and a plurality of interface facilities each interconnecting one of said transmission means and said switching network, and comprising the steps:
ascertaining signals representing arrival time of each of said predetermined number of packets at one of said interface facilities from one of said transmission means;
inserting the ascertained signals into an individual one of said predetermined number of packets;
communicating each of said predetermined number of packets through said packet switching network to another one of said interface facilities;
generating a control signal upon communication of all of said predetermined number of packets to said other interface facility;
determining signals representing the transmission delay of each of said predetermined number of packets from said one of said interface facilities to said other one of said interface facilities;
calculating a first set of signals representing a present transmission delay for all of said predetermined number of packets in response to said control signal and said delay signals;
storing a second set of signals representing a reference transmission delay; and
generating a report signal indicating excursions of said present transmission delay from said reference transmission delay in response to subsets of signals of said first and second sets of signals.

23. The invention of claim 22 wherein said step of determining said delay signals comprises the steps of ascertaining signals representing departure time of each of said predetermined number of packets from said other one of said interface facilities and calculating said delay signals in response to said arrival time signals and said departure time signals; and
said calculating step comprises the steps of storing sum signals and adding said delay signals to said sum signals.

24. The invention of claim 23 wherein said calculating step further comprises the step of storing the most significant signals of said sum signals as said first set of signals.

25. The invention of claim 24 wherein said adding step further comprises the step of effectively performing a predetermined division of the sum signals in preparation for the receipt of another packet of the next sequential predetermined number of packets.

26. The invention of claim 22 wherein said step of ascertaining said arrival time signals comprises the step of complementing signals representing the arrival time; and said step of determining said delay signals comprises the steps of serially adding said arrival time signals and said departure time signals and storing the results of said serial addition to generate said delay signals.

27. The invention of claim 22 wherein said step of generating said report signal comprises the steps of storing a plurality of mask signals;

generating logically a first and a second set of mask output signals in response to said first and second sets of bit signals and said mask signals; and comparing said sets of mask output signals for generating said report signal indicating excursions of said present transmission delay from said reference transmission delay upon said sets of output signals not being equal.

* * * * *